(12) United States Patent
Dehn et al.

(10) Patent No.: US 11,458,662 B2
(45) Date of Patent: Oct. 4, 2022

(54) METHOD FOR PRODUCING PLASTIC/METAL HYBRID COMPONENTS

(71) Applicant: LEONI BORDNETZ-SYSTEME GMBH, Kitzingen (DE)

(72) Inventors: Manfred Dehn, Kitzingen (DE); Andreas Kremling, Bergtheim—Opferbaum (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 412 days.

(21) Appl. No.: 16/628,754

(22) PCT Filed: May 30, 2018

(86) PCT No.: PCT/EP2018/064271
§ 371 (c)(1),
(2) Date: Jan. 6, 2020

(87) PCT Pub. No.: WO2019/007595
PCT Pub. Date: Jan. 10, 2019

(65) Prior Publication Data
US 2020/0139601 A1    May 7, 2020

(30) Foreign Application Priority Data
Jul. 4, 2017   (DE) .................... 10 2017 211 296.4

(51) Int. Cl.
*B29C 45/14*    (2006.01)
*B29C 45/16*    (2006.01)
(Continued)

(52) U.S. Cl.
CPC .......... *B29C 45/1679* (2013.01); *B29C 33/42* (2013.01); *B29C 45/0053* (2013.01);
(Continued)

(58) Field of Classification Search
CPC ........... B29C 45/1679; B29C 45/0053; B29C 45/14639; B29C 45/26
See application file for complete search history.

(56) References Cited

U.S. PATENT DOCUMENTS 4,171,563 A  * 10/1979  Withoos ............. B29C 44/1228
                                                            343/912
5,329,696 A  *  7/1994  Morita ............. B29C 45/14639
                                                             29/841
(Continued)

FOREIGN PATENT DOCUMENTS

DE          1201034 A       9/1965
DE     102006030805 A1      1/2008
(Continued)

OTHER PUBLICATIONS

English translation of DE 102015004896 as found on Google Patent. (Year: 2022).*

*Primary Examiner* — Edmund H Lee
(74) *Attorney, Agent, or Firm* — Laurence A. Greenberg; Werner H. Stemer; Ralph E. Locher

(57) ABSTRACT

A method produces plastic/metal hybrid components, in particular for the automotive field. A plastic compound is injected into a tool mold, and the tool mold has a core onto which a metal is injected. The plastic compound is then injected into the tool mold such that the metal is back-molded with the plastic compound and is fixed to the plastic in order to produce a blank. The tool mold is used to produce at least one depression in the surface of the blank, the depression being at least partly filled with a metal as part of a first additional processing.

13 Claims, 4 Drawing Sheets

(51) Int. Cl.
    *B29C 33/42*     (2006.01)
    *B29C 45/00*     (2006.01)
    *B29C 45/26*     (2006.01)
    *B29L 31/30*     (2006.01)
    *B29L 31/34*     (2006.01)

(52) U.S. Cl.
    CPC ........ *B29C 45/14639* (2013.01); *B29C 45/26* (2013.01); *B29C 2045/0079* (2013.01); *B29C 2045/2697* (2013.01); *B29L 2031/3002* (2013.01); *B29L 2031/3481* (2013.01)

(56) References Cited

U.S. PATENT DOCUMENTS

| | | | |
|---|---|---|---|
| 6,435,366 B1 | 8/2002 | Johnson et al. | |
| 2006/0231231 A1 | 10/2006 | McCullough | |
| 2009/0029185 A1* | 1/2009 | Lee | H01F 17/0006 430/318 |
| 2017/0236785 A1* | 8/2017 | Chen | H01L 21/4825 257/659 |

FOREIGN PATENT DOCUMENTS

| | | | |
|---|---|---|---|
| DE | 202006011672 U1 | | 1/2008 |
| DE | 102014214134 A1 | | 1/2016 |
| DE | 102015004896 A1 | | 10/2016 |
| JP | 57032925 | * | 2/1982 |
| JP | S60139416 A | | 7/1985 |

* cited by examiner

METHOD FOR PRODUCING PLASTIC/METAL HYBRID COMPONENTS

BACKGROUND OF THE INVENTION

Field of the Invention

The invention relates to a process for the production of plastics-metal-hybrid components, in particular for the motor vehicle sector, where a plastics composition is injected into a mold. The invention also relates to a plastics-metal-hybrid component.

Electronic and electromechanical modules, for example power distribution units, fuse boxes or relay boxes, are typically subject to what are known as EMC requirements and/or conductivity requirements, and for this reason the housings currently used for these modules are mostly made entirely of metal. However, these housings are substantially heavier and more expensive than plastics housings.

However, it is difficult to comply with the appropriate EMC requirements and/or conductivity requirements with housings made of a conductive plastic, or by using conductive lacquers or metallic insert parts.

SUMMARY OF THE INVENTION

In light of the above, it is an object of the invention to provide an advantageously configured plastics-metal-hybrid component, and also an advantageous process for the production of plastics-metal-hybrid components.

This object is achieved in the invention via a process with the features of the independent process claim, and also via a plastics-metal-hybrid component with the features of the independent component claim. Preferred embodiments are found in the dependent claims. The advantages and preferred embodiments mentioned in respect of the process are in principle also valid for the plastics-metal-hybrid component, and vice versa.

An appropriate process serves here for the production of plastics-metal-hybrid components which are preferably designed for use in the motor vehicle sector, and for which there are typically specified EMC requirements and/or specified conductivity requirements.

A mold is used here with a core which is preferably configured as fixed component of the mold, and in the context of the process a metal or a metal alloy is sprayed onto the core, for example by thermal spraying and in particular by arc wire spraying. Alternatively, the core is configured as separate insert part, and in this case the application of the metal or of the metal alloy preferably takes place outside of the mold or outside of the injection-molding machine, and in particular in the course of a separate step. Thereafter, in particular directly thereafter, i.e. without any intermediate step, a plastics composition, for example PA6 GF10 (polyamide with 10% of glass fiber) or PA6 GF30, is injected into the mold in a manner such that, for the production of a blank, the metal or metal alloy is overmolded with the plastics composition and is fixed on the plastics composition, or at least on the finished plastic, for example via what is known as microscopic intermeshing.

By means of the mold, moreover, at least one depression is produced in a surface of the blank, and in the context of a first further operation a metal or a metal alloy is introduced into said depression, which therefore in the context of a first further operation is in particular at least to some extent filled, and preferably completely filled, with a metal or a metal alloy. The introduction of the metal or of the metal alloy is more preferably achieved here by means of a casting process or pressurized casting process, or by means of a spray process.

In a preferred embodiment, conductor-track structures are realized here via the introduction of metal or via the introduction of a metal alloy into the at least one depression. However, the application of a metal or a metal alloy onto the core of the mold preferably realizes metallization over an area; said metallization can by way of example be used as electromagnetic shielding.

It is thus possible by way of example, to realize a housing part, a housing or a fuse box in each case configured via a plastics body which has metallization over an area on the external side and/or on the internal side for electromagnetic shielding, and also a conductor-track structure on the external side and/or on the internal side, for example as electrical connection structure for a display element or for the configuration of a test connection. The process presented here permits the production of plastics-metal-hybrid components at comparatively low technical cost; this process is therefore also inter alia suitable for mass production.

It is preferable here that the melting point of a metal or metal alloy, for example copper, aluminum or zinc, sprayed onto the core is higher than that of the plastics composition. This ensures that the metal or metal alloy is not subject to melting, or to incipient melting, when it is overmolded with the plastics composition.

It is further preferable that the melting point of a metal or metal alloy introduced into the at least one depression in the surface of the blank in the context of the first further operation is lower than that of the plastics composition, an example therefore being a tin alloy, so that in turn the plastics composition is not subject to melting, or to incipient melting, as a result of introduction of the metal or metal alloy.

It is therefore possible to use this process to realize metallization on a plastic, irrespective of which metals or metal alloys are intended for use, and in particular irrespective of the melting points of the metals or metal alloys provided for metallization, and of the plastics provided.

In a useful process variant here, the mold comprises a basic mold into which the core can be, and is, inserted after the metal or the metal alloy has been sprayed onto the core, and before the plastics composition is injected into the mold. The spraying of the metal or metal alloy onto the core then preferably takes place outside of the basic mold; this simplifies the application of the metal or the metal alloy.

Alternatively, the core is not removed from the basic mold for application of the metal or metal alloy, and/or application of the metal or metal alloy takes place within the basic mold or directly in the injection-molding machine. In this case, the core is then preferably, as it were, fixedly mounted in the basic mold, and is by way of s example before the beginning of the production process inserted into the basic mold and fixedly connected to the basic mold, preferably fixedly connected to the basic mold by means of a screw thread. In this instance, there is therefore no removal of the core during the production process. In some applications here, the core is irreversibly connected to the basic mold, i.e. by way of example adhesive-bonded or soldered thereto. Irrespective of this, the metal or metal alloy here is preferably applied directly in the injection-molding machine; this simplifies the process.

In some cases, the core is pretreated here before the metal or metal alloy is sprayed onto same, for example in order to avoid undesirably strong adhesion of the metal or metal alloy on the core and damage to the metal or metal alloy during release of the blank from the mold.

It is further preferable here that the core consists of a material of higher quality than the basic mold, where the higher-quality material advantageously provides long operating time, long lifetime and/or easy release of workpieces from the mold, i.e. easy demolding.

As already mentioned above, it is preferable that the spraying of a metal or metal alloy onto the core realizes metallization over an area of the blank; accordingly, the metal or metal alloy is sprayed onto an area of the core and specifically in particular in a manner such that a complete side of the core is coated with the metal or metal alloy. A blank is thus fashioned which, within a region, has a coherent metal coating, and which therefore is completely metallized at least in a region of its surface, and specifically comprises no metallic structures or conductor tracks. This type of metal coating over an area then typically serves to form shielding, or electromagnetic shielding. This method is then used by way of example to produce a housing part, for example a housing cover, a housing, or else by way of example a fuse box, which in each case has been metallized on the inside over a substantial area, or completely, and consequently comprises electromagnetic shielding.

However, the introduction of metal or metal alloy into the at least one depression of the blank preferably serves, as already mentioned above, for the realization of metallic structures, for example conductor-track structures. Irrespective of this, the introduction of the metal or metal alloy into the at least one depression of the blank advantageously achieved by means of a casting process or injection-molding process, where as required by an intended application at least one depression is typically at least to some extent filled, and in particular completely filled, with the metal or metal alloy. Alternatively, the introduction of the metal or metal alloy is achieved by means of a spray process, e.g. by means of thermal spraying.

In another advantageous process variant, at least one depression which extends to the opposite side of the plastic of the blank, or that penetrates same, is configured via the mold, or else another method, for example a downstream mechanical operation, is used to fashion a corresponding depression that extends to the opposite side of the blank. It is then further preferable, in particular in the context of the first further operation, that a metal or metal alloy is introduced, for example via a casting process or injection-molding process, into such a depression that extends to the opposite side of, or penetrates, the body. As required by the intended application here, the metal or metal alloy fills, to some extent or completely, the depression that extends to the opposite side of the body, or else the depression is merely subjected to a type of metallization of the surfaces. By this means it is then further preferable that connections or through-connections are realized. However, the through-connections are then specifically not realized on a printed circuit board, but instead are by way of example realized at a wall of a plastics housing or of another plastics-metal-hybrid component.

In an advantageous embodiment, the corresponding depression that extends to the opposite side of the blank, or penetrates same, is positioned in the region of an area of metal coating which in particular has been produced via spraying of a metal or metal alloy onto the core. In particular in this case, it is then further preferable that metal is introduced into this depression in a manner such that the resultant interspersed metal configured in the depression is connected to the area of metal coating, in particular connected in electrically conductive manner, in the manner of a through-connection.

If then the plastics-metal-hybrid component by way of example forms a part of a housing, or forms a housing, the depression that extends to the opposite side of, or that penetrates, the body is designed in one embodiment in the manner of a perforation, and in this case it is then preferable that the metal or metal alloy is introduced into the perforation in a manner such that the walls of the perforation are metallized. It is then possible by way of example that a cable or parts of a cable, for example an insulated cable end, is/are introduced into said perforation, or is/are passed through the perforation, and the metallized walls can by way of example be connected in electrically conductive manner to shielding of an appropriate cable. If then an area of metallization is also realized on the internal side of the housing or of the housing part, and shielding is thus realized within the housing, it becomes possible to produce an electrical connection between the shielding within the housing and the cable shielding.

In another advantageous process variant, in particular before the first further operation, an electrical or electronic unit is placed into the at least one depression of the blank, or else such a unit is attached in the vicinity of the at least one depression. The at least one depression is then, in particular in order to form a conductor structure, at least to some extent filled with a metal or with a metal alloy, or the corresponding metal or the corresponding metal alloy is introduced into the at least one depression and specifically in particular in a manner such that the electrical or electronic unit is connected in electrically conductive manner to the conductor structure.

Said unit is configured here by way of example as a light-emitting diode or as a sensor, and the plastics-metal-hybrid component is by way of example designed as housing part or as housing. If then an area of metallization is additionally realized on the internal side as electromagnetic shielding, and also at least one depression which extends to the opposite side of, or penetrates, the body and into which a metal or metal alloy has been introduced, with resultant connection of the area of metallization on the internal side to the conductor structure and therefore finally to the sensor of the light-emitting diode in electrically conductive manner, it becomes possible by way of example to realize a housing or a housing part with a sensor on the external side or with a light-emitting diode attached on the external side; said sensor or light-emitting diode can be used to detect the current induced in the housing, or the induced voltage, and to emit a suitable signal, for example illumination of the light-emitting diode.

A further advantageous process variant uses, by way of example, lacquering, dip-coating or in-mold coating with a plastic to apply an insulation layer to the blank after the first further operation. Said application of the insulation layer in particular takes place here in a manner such that the insulation layer covers the at least one depression filled at least to some extent with a metal. A type of plastic-metal-plastic sandwich structure is thus then realized in this region.

Further information about embodiments of the invention is provided below with reference to diagrams.

DESCRIPTION OF THE INVENTION

The same reference signs are used for identical parts in each of the figures.

Figure 7:
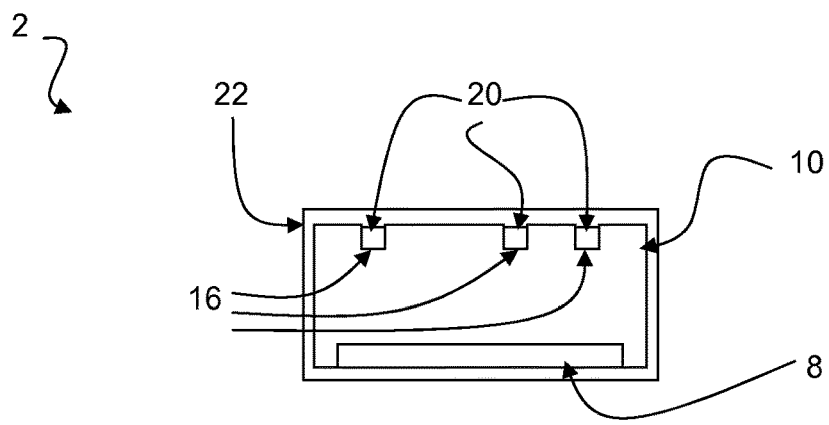
FIG. 7 is a sectional depiction of the blank with the metal coating, with the three groove-like depressions filled with metal, and with a covering insulation layer.

A process described by way of example below serves for the production of a plastics-metal-hybrid component 2, as shown diagrammatically by way of example in FIG. 7. A corresponding plastics-metal-hybrid component 2, for which the abbreviated term hybrid component 2 is used below, is preferably designed here for use in the motor vehicle sector, and accordingly is preferably used in a motor vehicle.

Figure 1:
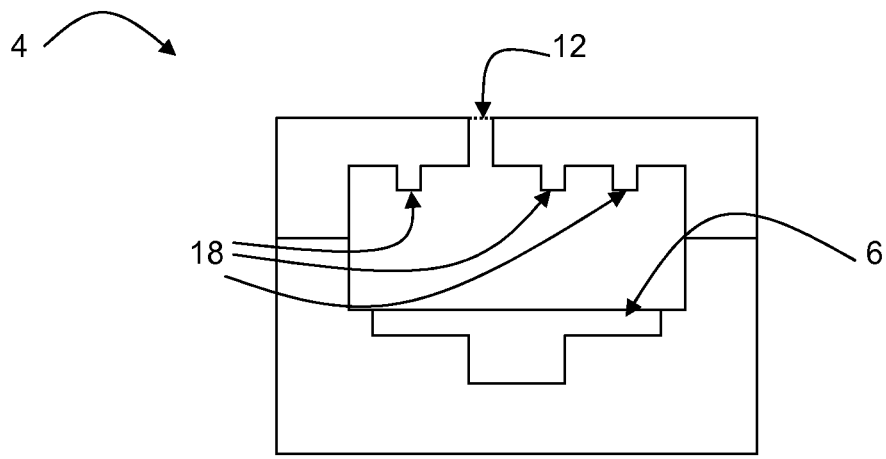
FIG. 1 is a sectional depiction of a mold with a core.
Figure 2:
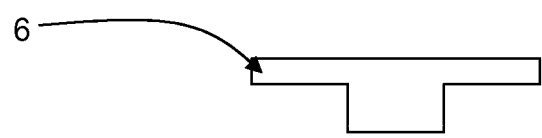
FIG. 2 is a side view of the core.

The hybrid component 2 is produced here with the aid of a mold 4 shown diagrammatically in FIG. 1, which comprises a core 6 separately depicted in FIG. 2. This core is designed as separate insert part, and this core 6 is coated, in a first step outside of the other parts of the mold 4, with a metal 8 or with a metal alloy, where the corresponding metal 8 is applied in the embodiment by arc wire spraying.

Figure 3:
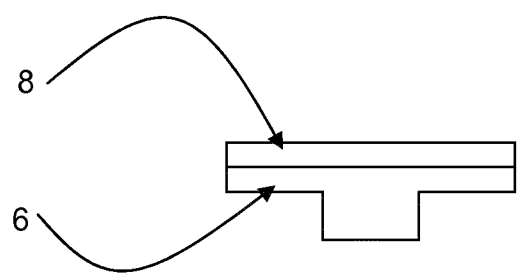
FIG. 3 is a side view of the core with a metal coating applied.
Figure 4:
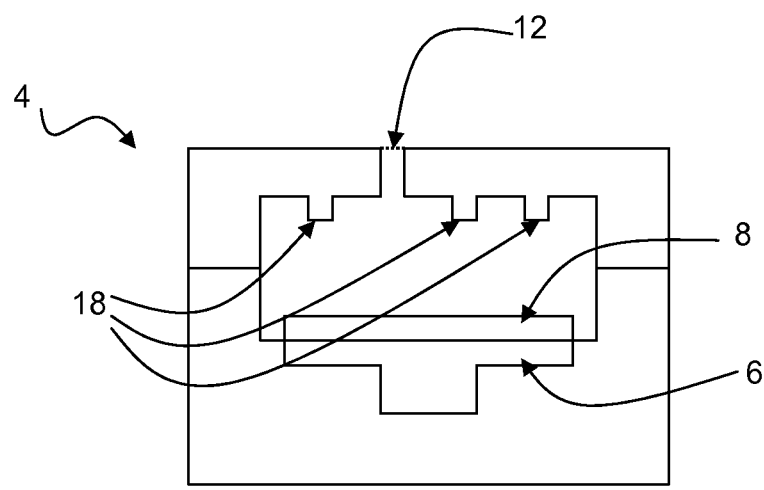
FIG. 4 is a sectional depiction of the mold with the core and with the metal coating applied.

The core 6 depicted in FIG. 3, coated with the metal 8, is thereafter inserted into the other parts of the mold 4, as can be seen in FIG. 4. In a further process step, a plastics composition 10 is then charged into the mold 4 by way of an aperture 12 intended for this purpose in the mold 4. The metal 8 on the core 6 here is overmolded with the plastics composition 10, and therefore after hardening of the plastics composition 10 the metal 8 is fixed on the plastic, for example via microscopic intermeshing.

Figure 5:
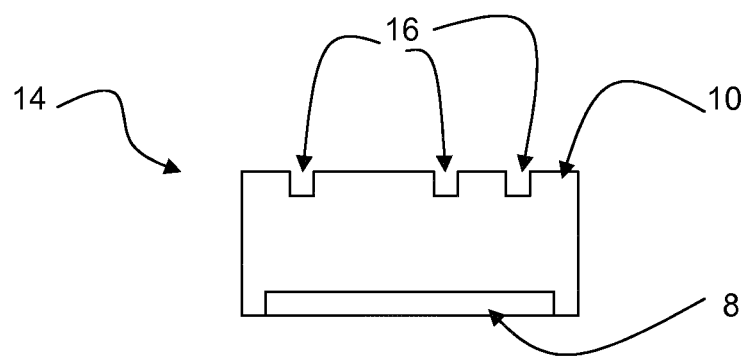
FIG. 5 is a sectional depiction of a blank which has a metal coating and has three depressions, and which has been produced by means of the mold.

A blank 14 depicted in FIG. 5 is thus produced, with a metal layer made of the metal 8 adhering on one surface of the plastics composition 10. It is preferable that the melting point of the metal 8 here is higher than that of the plastics composition, and it is more preferable that copper, a copper alloy, aluminum, or an aluminum alloy is used as metal 8. That surface of the plastics composition 10 that is covered by the metal 8 is moreover preferably configured as extensive and coherent area, and accordingly the metal 8 coats a substantial area of the plastics composition 10, i.e. the metal 8 on the surface of the plastics composition 10 preferably does not form any structures, for example conductor tracks, but instead simply forms a coating over a substantial area.

The finished hybrid component 2 here forms by way of example a housing or a housing part for electronic or electrical components, e.g. a fuse box, and in this case the metal 8 preferably forms electromagnetic shielding configured on the internal side of the housing, of the housing part or of the fuse box. The housing, the housing part or the fuse box here is preferably, as it were, clad on the internal side by the metal 8.

The blank 14 thus produced moreover has, in a surface in the embodiment, three depressions 16 which are realized with the aid of the mold 4, which has corresponding structures 18 intended for this purpose, or has corresponding projections protruding into the internal space. In the context of initial further processing, these depressions 16 are filled at least to some extent by a metal 20, for example via a casting or pressurized casting process, where the metal 20 used for this purpose typically differs from the metal 8: in most cases the melting point of the metal 20 is lower than that of the plastics composition 10. This also applies to the embodiment described here, in which a tin alloy is used as metal 20.

Figure 6:
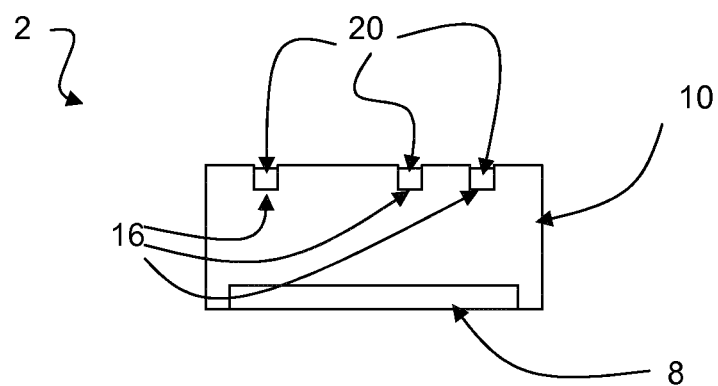
FIG. 6 is a sectional depiction of the blank with the metal coating and with the three groove-like depressions filled with metal.

It is preferable here that structures or conductor tracks are realized via the filling, at least to some extent, of the depressions 16 with the metal 20, and that this is therefore typically not metallization of the type preferably realized by means of the metal 8 over a substantial area. The overall effect is then preferably that two metallization procedures, using two different metals or metal alloys, are realized on the plastics composition 10, one being configured as metal coating of an area, and one being configured as conductor track structure. This type of hybrid component 2 is indicated in FIG. 6.

In some cases there is a subsequent second further operation, in the context of which by way of example an insulation layer 22 is applied to the blank 14, for example by lacquering or by in-mold coating with a plastic. Application of the insulation layer 22 in particular takes place here in a manner such that the insulation layer 22 covers at least the depressions 16 filled at least to some extent with the metal 20, and therefore also covers the metal 20. Alternatively, or in addition to the above, the insulation layer 22 is applied in a manner such that the insulation layer covers the metal 8 adhering on the plastics composition 10.

Figure 8:
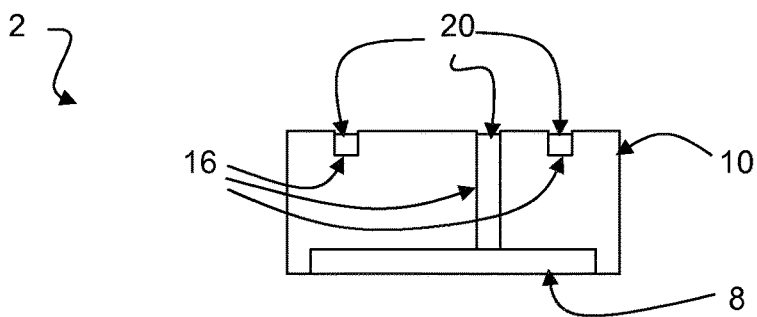
FIG. 8 is a sectional depiction of an alternative design of the blank with a metal coating, with two groove-like depressions filled with metal, and with a depression which extends to the opposite side of the body and which is filled with a metal.

Another design of the hybrid component 2 is represented in FIG. 8. One of the depressions 16 here is configured as a depression 16 which extends to the opposite of the plastics composition 10, and which is at least to some extent filled with the metal 20. This depression 16 is positioned in the region in which the metal 8 adheres on the plastics composition 10, and there is consequently an electrically conductive connection configured between the metal 8 and the metal 20 in the depression 16 which extends to the opposite side of the plastics composition. The metal 20 in the depression 16 in this embodiment therefore forms a type of through-connection which, however, is not present on a printed circuit board but instead, by way of example, is present in a wall of a housing.

Figure 9:
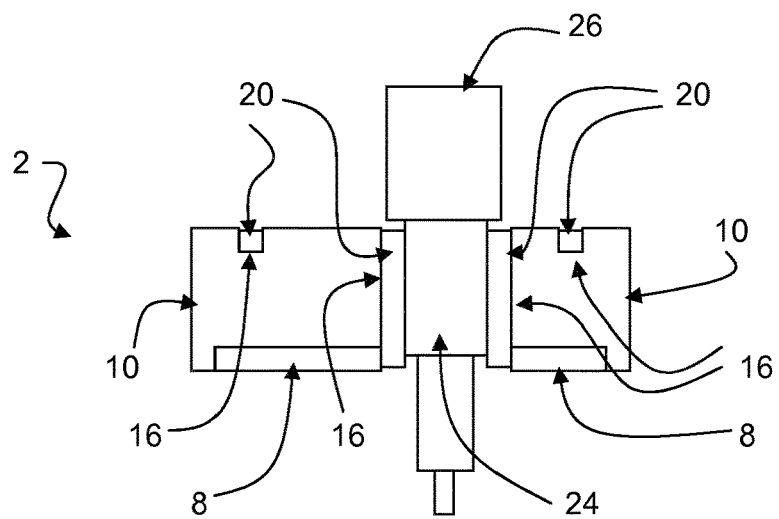
FIG. 9 is a sectional depiction of a second alternative design of the blank with a metal coating, with two groove-like depressions filled with metal, and with a metallized depression configured as perforation in which an insulated cable end is present, and also

FIG. 9 is a diagram of a slight modification of the above design, with larger diameter of the depression 16 which extends to the opposite side of the body. The metal 20 here does not fill a large part of the volume of the depression 16, but instead a metal layer made of the metal 20 is provided only to the surface of the depression 16 which extends to the opposite side of the body, or to the surface of the perforation. The hybrid component 2 is then configured by way of example as housing for electrical or electronic components, and has shielding configured via the metal 8 and arranged on the internal side within the housing. This shielding is, as it were, continued into the depression 16 via the metal 20 in the depression 16; it is thus possible to connect this shielding in a simple and electrically conductive manner to the shielding 24 of a cable 26.

Figure 10:
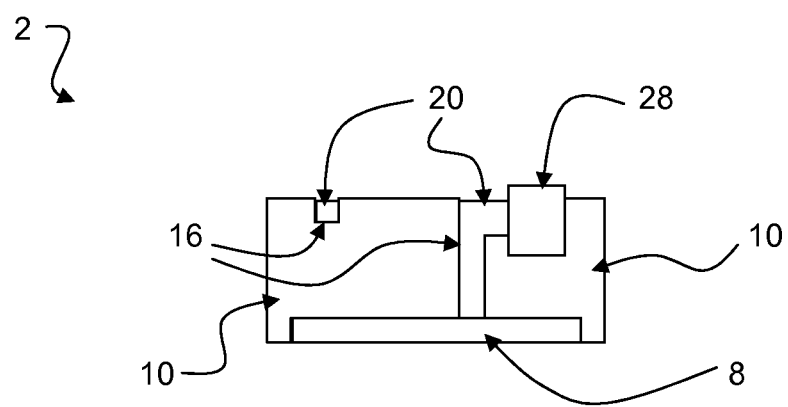
FIG. 10 is a sectional depiction of a third alternative design of the blank with a metal coating, with a groove-like depression filled with metal, and with a depression in which a sensor is present and which is to some extent groove-like and to some extent configured as perforation, and also is filled with metal.

FIG. 10 is a diagram of another design of the hybrid component 2. A sensor 28 with a display element here is first introduced into, and fixed in, one of the depressions 16, and the metal 20 is then introduced into said depression 16. The manner of introduction of the metal 20 is such that on the one hand the sensor 28 is connected in electrically conductive manner to the metal 20 and on the other hand the metal 20 is connected in electrically conductive manner to the metal 8, with resultant production of an electrically conductive connection between the sensor 28 and the metal 8 by way of the metal 20 in the depression that extends to the opposite side of the plastics composition 10. The hybrid component 2 is then by way of example again designed as housing for electrical or electronic components, and the metal 8 again forms by way of example shielding on the internal side of the housing. The sensor then serves by way of example to detect the current induced within the housing, or the induced voltage, and to emit a correlated signal by way of the display element of the sensor 8, said element being configured by way of example as simple light-emitting diode.

The invention is not restricted to the embodiment described above: other variants of the invention can also be derived therefrom by the person skilled in the art without departing from the subject matter of the invention. In particular, moreover, all of the individual features described in connection with the embodiment can also be combined in a different manner with one another without departing from the subject matter of the invention.

LIST OF REFERENCE SYMBOLS

2 Plastics-metal-hybrid component
4 Mold
6 Core
8 Metal
10 Plastics composition
12 Aperture
14 Blank
16 Depression
18 Structures
20 Metal
22 Insulation layer
24 Shielding
26 Cable
28 Sensor with display

What is claimed is:

1. A process for producing plastic-metal-hybrid components, which comprises the steps of:
providing a mold having a core and onto the core metal is sprayed;
injecting a plastic composition into the mold, the plastic composition being injected into the mold in a manner such that, for producing a blank, the metal is overmolded with the plastic composition and is fixed on the plastic composition;
producing at least one depression in a surface of the blank by means of the mold; and
filling the at least one depression at least to some extent with a further metal.

2. The process according to claim 1, wherein the metal has a melting point higher than that of the plastic composition and is sprayed onto the core.

3. The process according to claim 1, wherein the further metal has a melting point lower than that of the plastic composition.

4. The process according to claim 1, wherein the mold has a basic body into which the core is inserted after the metal has been sprayed onto the core and before the plastic composition is injected into the mold.

5. The process according to claim 1, which further comprises spraying the metal onto an area of the core in a manner such that a region of the blank has a metal coating.

6. The process according to claim 1, which further comprises filling the at least one depression of the blank at least to some extent with the further metal by means of a casting process or an injection-molding process.

7. The process according to claim 5, which further comprises configuring the at least one depression as a depression which extends to an opposite side of the blank and into which the further metal is introduced by means of a casting process or an injection-molding process.

8. The process according to claim 7, wherein the at least one depression which extends to the opposite side of the blank is positioned in the region of the metal coating, and in that the further metal is introduced into the depression in a manner such that the further metal is an interspersed metal thus configured in the depression is connected to the metal coating.

9. The process according to claim 1, which further comprises:
placing an electrical or electronic unit into the at least one depression of the blank; and
filling the at least one depression of the blank at least to some extent with the further metal in order to configure a conductor structure, and in a manner such that the electrical or electronic unit is connected in an electrically conductive manner to the conductor structure.

10. The process according to claim 1, which further comprises subsequently after the filling step, applying an insulation layer to the blank.

11. The process according to claim 1, wherein the plastic-metal-hybrid components are configured for use in a motor vehicle.

12. The process according to claim 1, which further comprises filling the at least one depression of the blank completely with the further metal by means of a casting process or an injection-molding process.

13. The process according to claim 10, wherein the insulation layer covers at least one side of the depression filled at least to some extent with the further metal.

* * * * *